US012718380B1

(12) United States Patent
Hardy et al.

(10) Patent No.: US 12,718,380 B1
(45) Date of Patent: Aug. 25, 2026

(54) IMAGE SEGMENTATION USING DEEP NEURAL NETWORKS

(71) Applicant: UPWORK, INC., San Francisco, CA (US)

(72) Inventors: Megan Hardy, Oakland, CA (US); Andrew Rabinovich, San Francisco, CA (US)

(73) Assignee: Upwork Inc., San Francisco, CA (US)

( * ) Notice: Subject to any disclaimer, the term of this patent is extended or adjusted under 35 U.S.C. 154(b) by 679 days.

(21) Appl. No.: 17/686,893

(22) Filed: Mar. 4, 2022

Related U.S. Application Data

(60) Provisional application No. 63/157,607, filed on Mar. 5, 2021.

(51) Int. Cl.

| | |
|---|---|
| ***G06T 7/194*** | (2017.01) |
| ***G06N 3/044*** | (2023.01) |
| ***G06N 3/08*** | (2023.01) |
| ***G06T 5/50*** | (2006.01) |
| ***G06T 5/70*** | (2024.01) |

(52) U.S. Cl.
CPC ............ *G06T 7/194* (2017.01); *G06N 3/044* (2023.01); *G06N 3/08* (2013.01); *G06T 5/50* (2013.01); *G06T 5/70* (2024.01); *G06T 2207/10016* (2013.01); *G06T 2207/20081* (2013.01); *G06T 2207/20084* (2013.01)

(58) Field of Classification Search
CPC .. G06T 7/194; G06T 5/70; G06T 5/50; G06T 2207/10016; G06T 2207/20081; G06T 2207/20084; G06N 3/044; G06N 3/08
See application file for complete search history.

(56) References Cited

U.S. PATENT DOCUMENTS 11,122,240 B2 9/2021 Peters
11,158,121 B1 10/2021 Tung
(Continued)

OTHER PUBLICATIONS

Yulin Wang: Glance and Focus: a Dynamic Approach to Reducing Spatial Redundancy in Image Classification (Year: 2020).*
(Continued)

*Primary Examiner* — Stephen S Hong
*Assistant Examiner* — Carl E Barnes, Jr.
(74) *Attorney, Agent, or Firm* — Haverstock & Owens, A Law Corporation

(57) ABSTRACT

Methods, systems, and apparatus, including computer programs encoded on computer storage media, for training a neural network to perform segmentation. One of the methods includes obtaining a sequence of input images each corresponding to a time step; and at each of a plurality of the time steps: processing a first input image of the sequence that corresponds to the time step using the neural network to generate a new network output that identifies foreground pixels and background pixels of the first input image; obtaining a previous network output generated at a previous time step that identifies foreground pixels and background pixels of a second input image of the sequence; and determining a difference between the new network output and the previous network output; and determining an update to network parameters of the neural network using the difference determined at each time step of the plurality of time steps.

14 Claims, 10 Drawing Sheets

(56) References Cited

U.S. PATENT DOCUMENTS

| | | | | |
|---|---|---|---|---|
| 2006/0285747 | A1* | 12/2006 | Blake | G06T 7/162 382/180 |
| 2013/0101002 | A1 | 4/2013 | Gettings | |
| 2018/0253865 | A1* | 9/2018 | Price | G06N 3/084 |
| 2020/0334789 | A1 | 10/2020 | Zhang | |
| 2020/0342572 | A1 | 10/2020 | Chen | |
| 2020/0364872 | A1* | 11/2020 | Shlens | G06T 7/11 |
| 2021/0092462 | A1 | 3/2021 | Cox | |
| 2021/0150278 | A1* | 5/2021 | Dudzik | G06T 7/593 |
| 2021/0250547 | A1 | 8/2021 | Jiang | |
| 2021/0281867 | A1* | 9/2021 | Golinski | G06N 3/045 |
| 2025/0209627 | A1* | 6/2025 | Yeh | A61B 5/327 |

OTHER PUBLICATIONS

Cai et al., "Disentangled image matting," Proceedings of the IEEE International Conference on Computer Vision, Oct. 2019, pp. 8819-8828.

Chen et al., "Semantic human matting," Proceedings of the 26th ACM International Conference on Multimedia, Oct. 2018, pp. 618-626.

Cho et al., "Learning Phrase Representations using RNN Encoder-Decoder for Statistical Machine Translation," arXiv, Sep. 3, 2014, 15 pages.

Elman, "Finding structure in time," Cognitive Science, Mar. 1990, 14(2): 179-211.

Fan et al., "Shifting more attention to video salient object detection," Proceedings of the IEEE/CVF Conference on Computer Vision and Pattern Recognition, Jun. 2019, pp. 8554-8564.

He et al., "Deep residual learning for image recognition," Proceedings of the IEEE Conference on Computer Vision and Pattern Recognition, Jun. 2016, pp. 770-778.

Hochreiter et al., "Long short-term memory," Neural Computation, Nov. 15, 1997, 9(8):1735-1780.

Hochreiter, "Untersuchungen zu dynamischen neuronalen netzen," Thesis for the degree of Master's, Technische Universitat Munchen, Institut fur Informatik, Jun. 15, 1991, 91(1), 125 pages (with machine translation).

Hou et al., "Deeply supervised salient object detection with short connections," Proceedings of the IEEE Conference on Computer Vision and Pattern Recognition, Jul. 2017, pp. 3203-3212.

Hu et al., "Recurrently aggregating deep features for salient object detection," Proceedings of the AAAI Conference on Artificial Intelligence, Apr. 27, 2018, 32(1):6943-6950.

Huang et al., "Densely connected convolutional networks," Proceedings of the IEEE Conference on Computer Vision and Pattern Recognition, Jul. 2017, pp. 4700-4708.

Ke et al., "Is a green screen really necessary for real-time human matting?," arXiv, Nov. 24, 2020, 11 pages.

Li et al., "End-to-end animal image matting," arXiv, Oct. 30, 2020, 14 pages.

Li et al., "Visual saliency based on multiscale deep features," Proceedings of the IEEE Conference on Computer Vision and Pattern Recognition (CVPR), Jun. 2015, pp. 5455-5463.

Lin et al., "Real-time high-resolution background matting," arXiv, Dec. 14, 2020, 16 pages.

Liu et al. "A simple pooling-based design for real-time salient object detection," Proceedings of the IEEE Conference on Computer Vision and Pattern Recognition, Jun. 2019, pp. 3917-3926.

Liu et al. "Picanet: Pixel-wise contextual attention learning for accurate saliency detection," IEEE Transactions on Image Processing, Apr. 2020, 13 pages.

Liu et al., "Parsenet: Looking wider to see better," arXiv, Nov. 19, 2015, 11 pages.

Long et al., "Fully convolutional networks for semantic segmentation, " Proceedings of the IEEE Conference on Computer Vision and Pattern recognition, Jun. 2015, pp. 3431-3440.

Lu et al. "Robust and efficient saliency modeling from image co-occurrence histograms," IEEE Transactions on Pattern Analysis and Machine Intelligence, Jan. 2014, 36(1):195-201.

Lu et al., "Saliency modeling from image histograms," Presented at 12th European Conference on Computer Vision, Florence, Italy, Oct. 7-13, 2012, pp. 321-332.

Perazzi et al., "Saliency filters: Contrast based filtering for salient region detection," Presented at 2012 IEEE Conference on Computer Vision and Pattern Recognition, Providence, RI, USA, Jun. 16-21, 2012, pp. 733-740.

Qin et al. "U2-net: Going deeper with nested u-structure for salient object detection," Pattern Recognition, Oct. 2020, 106:107404.

Qin et al., "Basnet: Boundary-aware salient object detection," Proceedings of the IEEE Conference on Computer Vision and Pattern Recognition, Jun. 2019, pp. 7479-7489.

Ronneberger et al., "U-net: Convolutional networks for biomedical image segmentation," Presented at 18th International Conference, Munich, Germany, Oct. 5-9, 2015, pp. 234-241.

Sengupta et al., "Background matting: The world is your green screen," Proceedings of the IEEE/CVF Conference on Computer Vision and Pattern Recognition, Jun. 2020, pp. 2291-2300.

Shen et al., "Deep automatic portrait matting," Presented at 14th European Conference, Amsterdam, The Netherlands, Oct. 11-14, 2016, pp. 92-107.

Simonyan et al., "Very deep convolutional networks for large-scale image recognition." arXiv, Dec. 23, 2014, 13 pages.

Song et al., "Pyramid Dilated Deeper ConvLSTM for Video Salient Object Detection," Proceedings of the European conference on computer vision (ECCV), Sep. 2018, 17 pages.

Valipour et al., "Recurrent fully convolutional networks for video segmentation," Presented at 2017 IEEE Winter Conference on Applications of Computer Vision (WACV), Santa Rosa, CA, USA, Mar. 24-31, 2017, pp. 29-36.

Wang et al., "Detect globally, refine locally: A novel approach to saliency detection," Proceedings of the IEEE Conference on Computer Vision and Pattern Recognition, Jun. 2018, pp. 3127-3135.

Xu et al. "Deep image matting," Proceedings of the IEEE Conference on Computer Vision and Pattern Recognition, Jul. 2017, pp. 2970-2979.

Zhang et al. "Amulet: Aggregating multi-level convolutional features for salient object detection," Proceedings of the IEEE International Conference on Computer Vision, Oct. 2017, pp. 202-211.

Zhang et al., "A late fusion con for digital matting," Proceedings of the IEEE Conference on Computer Vision and Pattern Recognition, Jun. 2019, pp. 7469-7478.

Zhang et al., "A novel graph-based optimization framework for salient object detection," Pattern Recognition, Oct. 22, 2016, 35 pages.

Zhao et al., "Pyramid scene parsing network," Proceedings of the IEEE Conference on Computer Vision and Pattern Recognition, Jul. 2017, pp. 2881-2890.

Lopez-Tapia, Santiago. "Gated Recurrent Networks for Video Super Resolution", EUPISCO 2020. 700-704. (Year:2020).

Wenzhe Shi et al. "Real-Time Single Image and Video Super-Resolution Using an Efficient Sub-Pixel Convolutional Neural Network." 2016 IEE Conference on Computer Vision and Pattern Recognition (CVPR). IEEE, 2016. 1874-1883. (Year:2016).

* cited by examiner

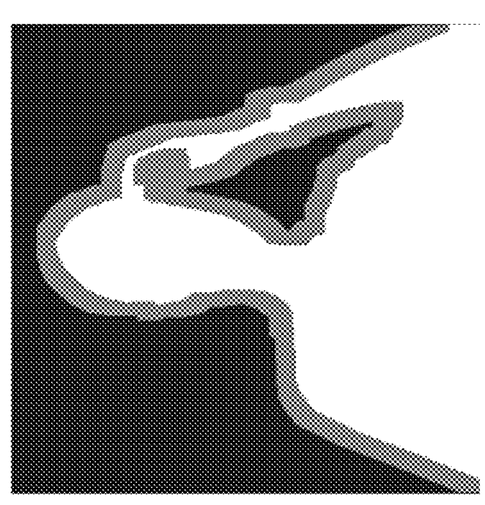
TRI-MAP
316
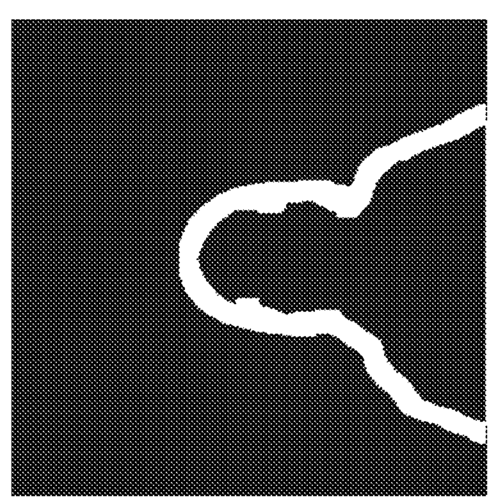
TRANSITION AREA
314
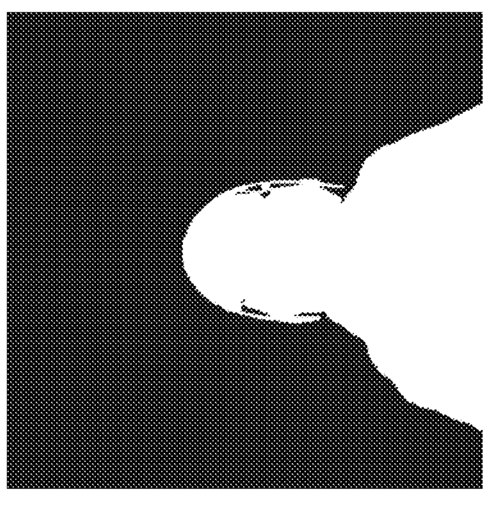
GROUND-TRUTH NETWORK
OUTPUT
312

IMAGE SEGMENTATION USING DEEP NEURAL NETWORKS

CROSS-REFERENCE TO RELATED APPLICATIONS

This application claims the benefit under 35 U.S.C. § 119 (e) of the filing date of U.S. Patent Application No. 63/157, 607, for Image Segmentation using Deep Neural Networks which was filed on Mar. 5, 2021 listing inventors Megan Hardy and Andrew Rabinovich, and which is incorporated here by reference in its entirety.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes an image to determine a segmentation of the image. In this specification, a segmentation of an image is an identification of one or more subsets of pixels of the image, wherein each subset includes one or more pixels that are semantically related to each other, e.g., those pixels that when combined form an image that has a meaning. In this specification, processing an image refers to processing the intensity values of the pixels of the image.

For example, the segmentation can identify, for each pixel in the image, one or more classes of the pixel, from a set of possible classes. Each segment of the image can then include the set of pixels that have the same class. Optionally, each segment of the image can include only pixels that have the same class and that are contiguous with each other. As a particular example, one or more classes in the set of possible classes can identify a semantic object that is represented by the pixel, e.g., "dog" or "city." As another particular example, one or more classes in the set of possible classes can identify some semantic state of an environment represented by the pixel, e.g., "daytime" or "winter."

In some implementations, the system can perform foreground-background segmentation of the image, where each pixel of the image is identified as either a foreground pixel or a background pixel. The foreground pixels can represent objects that are the focus of the image, e.g., a human being, while the background pixels can represent objects that are not the focus of the image, e.g., the environment surrounding the human being. In some such implementations, after segmenting the image into foreground and background, the system can remove each background pixel from the image and replace the removed background pixels with different pixels, e.g., by replacing each background pixel with a corresponding pixel from a different predetermined image. In some cases, foreground-background segmentation is called "salient object detection," or "SOD."

In some implementations, the system can perform segmentation on each image in a sequence of images, e.g., each video frame in a sequence of video frames representing a video. In some such implementations, the system can perform the segmentation in real-time. For example, the system can continuously receive new frames of a video (e.g., a video that is currently being recorded, such as the video captured of a participant in a live video conference call) and segment the video frames as they are received.

The system can use the segmentations of previous video frames in the sequence of video frames (i.e., segmentations that the system determined at respective previous time points) to determine the segmentation of a new video frame. In many contexts, consecutive frames in a video are often very similar, and thus the segmentation of the previous frame in the video can be very similar to the segmentation of the current frame in the video. Thus, by relying on previously-generated segmentations, the system can segment new video frames more efficiently and with higher accuracy.

In general, one innovative aspect of the subject matter described in this specification can be embodied in methods of training a neural network having a plurality of network parameters to perform foreground-background segmentation, where the methods include the actions of obtaining a sequence of input images, each input image corresponding to a time step; and at each time step of a plurality of the time steps: processing a first input image of the sequence that corresponds to the time step using the neural network to generate a new network output for the time step, wherein the new network output identifies a plurality of foreground pixels and a plurality of background pixels of the first input image; obtaining a previous network output generated by the neural network at a previous time step, wherein the previous network output identifies a plurality of foreground pixels and a plurality of background pixels of a second input image of the sequence that corresponds to the previous time step; and determining a difference between the new network output and the previous network output; and determining an update to the plurality of network parameters using the difference determined at each time step of the plurality of time steps.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

In some implementations, determining a difference between the new network output and the previous network output comprises determining a number of foreground pixels in the first input image identified by the new network output; determining a number of foreground pixels in the second input image identified by the previous network output; and determining the difference between the new network output and the previous network output using the respective numbers of foreground pixels. In some such implementations, determining the update to the plurality of network parameters comprises computing:

$$\ell_c = \frac{\frac{1}{n-1}\sum_{t=1}^{n}|\hat{\beta}_t - \hat{\beta}_{t-1}|}{\frac{1}{n}\sum_{i=0}^{n}\hat{\beta}_t}$$

wherein $\hat{\beta}_t$ is the number of foreground pixels identified in the input image corresponding to time step t, $\hat{\beta}_{t-1}$ is the number of foreground pixels identified in the input image corresponding to the time step t-1, and n is the number time steps.

In some implementations, determining the update to the plurality of network parameters comprises obtaining a ground-truth network output corresponding to a particular time step of the plurality of time steps; determining a difference between i) the network output generated by the neural network at the particular time step and ii) the ground-truth output; and determining the update using the determined difference.

In some implementations, determining the update to the plurality of network parameters comprises obtaining a ground-truth network output corresponding to a particular input image; identifying a plurality of transition pixels in the particular input image using the ground-truth network output, wherein each transition pixel is in a transition region between a plurality of foreground pixels of the particular input image and a plurality of background pixels of the particular input image; determining a difference between i) labels for the transition pixels identified by the ground-truth output and ii) labels for the transition pixels identified by the network output generated by the neural network in response to processing the particular input image; and determining the update using the determined difference.

In some implementations, the neural network comprises: an encoder subnetwork that is configured to process an encoder subnetwork input comprising the input image and to generate an embedding of the input image; and a decoder subnetwork that is configured to process a decoder subnetwork input generating using the embedding of the input image and to generate the network output. In some such implementations, the neural network further comprises a convolutional recurrent neural network that is configured to process the embedding of the input image and to generate an updated embedding of the input image; and the decoder subnetwork input comprises the updated embedding of the input image. In some such implementations, the decoder subnetwork comprises: a glance subnetwork that is configured to generate a glance subnetwork output that represents a global context of the first input image; a focus subnetwork that is configured to generate a focus subnetwork output that represents a local context of the first input image; a combining subnetwork that is configured to process the glance subnetwork output and the focus subnetwork output and to generate the network output. In some such implementations, the encoder subnetwork comprises a plurality of encoder subnetwork blocks that are each configured to process the encoder subnetwork input at a different spatial resolution; and the decoder subnetwork comprises a plurality of decoder subnetwork blocks that are each configured to process the decoder subnetwork input at a different spatial resolution. In some such implementations, each encoder subnetwork block corresponds to a respective decoder subnetwork block that operates at the same spatial resolution; and the neural network comprises, for each encoder subnetwork block, a skip connection between the encoder subnetwork block and the corresponding decoder subnetwork block.

The subject matter described in this specification can be implemented in particular embodiments so as to realize one or more of the following advantages.

In some implementations, the Recurrent Nested U-Net (RNU) and Recurrent Nested U-Net with Glance and Focus Decoders (RNU-GF) neural network architectures described herein can require no priors and no additional latency after the single forward pass of the network, compared to other recurrent neural network architectures that add additional latency by recurrently processing each input video frame at multiple respective processing time steps.

The neural network architectures described herein can take advantage of the simplicity of the nested U-structure, combined with the feed-forward nature of the Convolutional Gated Recurrent Unit, Conv-GRU, for real-time online processing. The combination of the nested U-structure with a Conv-GRU can allow the neural networks to utilize multi-level spatial context (e.g., from a $U^2$-Net) as well as temporal context (e.g., from a Region-based Fully Convolution Network, RFCN). The RNU architecture can attain global and local context through the aggregation of multi-scale decoder outputs. The RNU-GF architecture can further attain global and local context through the use of two decoders, one for "glance" or global context, and the other for "focus" of local context.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B are illustrations of example segmented images.

Like reference numbers and designations in the various drawings indicate like elements.

DETAILED DESCRIPTION

This specification describes a system that performs image segmentation.

FIGS. 1A, 1B, 2A, 2B and 2C are block diagrams of example neural network architectures. Each network architecture is an example of a system implemented as computer programs on one or more computers in one or more locations in which the systems, components, and techniques described below are implemented.

Figure 1A:
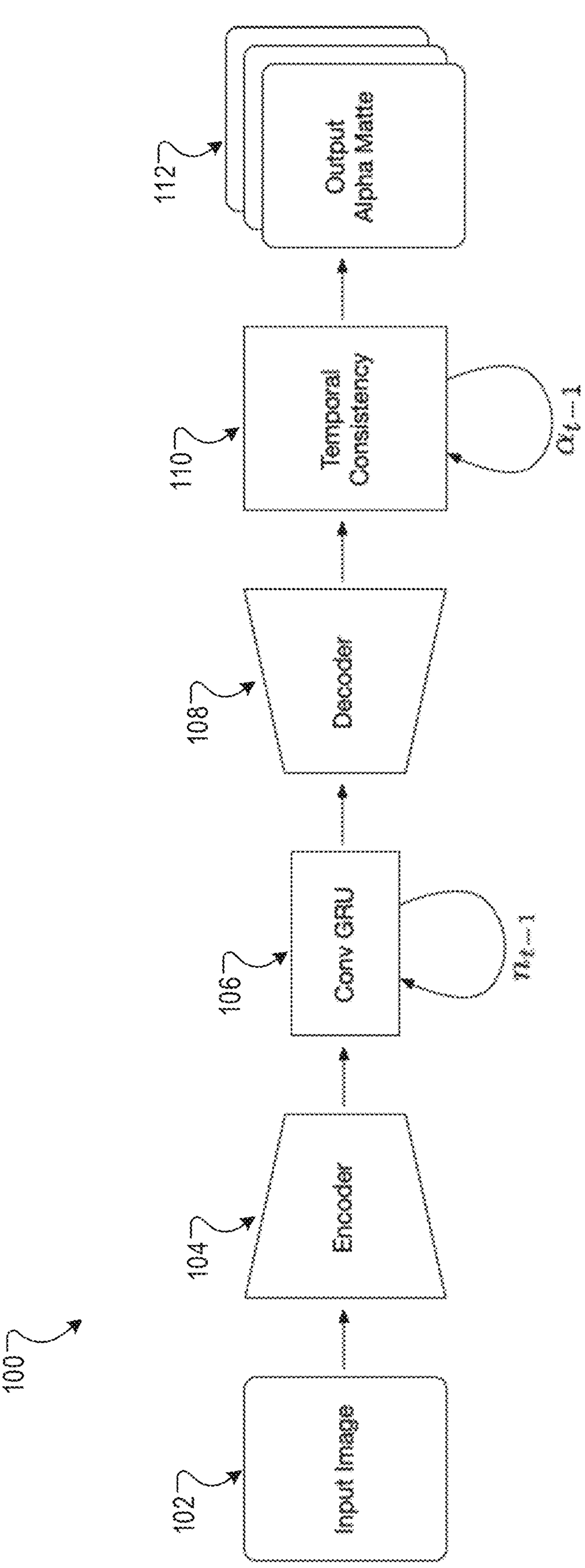
FIGS. 1A, 1B, 2A, 2B, and 2C are block diagrams of example neural network architectures.

FIG. 1A depicts a neural network 100 that is configured to process an input image 102 and to generate a network output 112 that identifies, for each pixel in the input image 102, whether the pixel is a foreground pixel or a background pixel. A network output that identifies foreground and background pixels is sometimes called an "alpha matte," which can be applied to the input image to remove the background pixels and generate a new image that includes only the foreground pixels of the input image.

The architecture of the neural network 100 is sometimes called a recurrent nested U-Net (RNU) architecture.

For each pixel of the input image 102, the network output 112 of the neural network 100 can identify a value between 0 and 1, where a value of 0 indicates that the pixel is entirely a background pixel, a value of 1 indicates that the pixel is entirely a foreground pixel, and a value between 0 and 1 indicates that the pixel is in a transition area between the foreground and background or that the pixel represents a translucent object in the foreground. Thus, for an input image I and output alpha matte a, the image can be represented as:

$$I = \alpha S + (1 - \alpha)B$$

where is the input image, Bis an image containing only the background pixels of the input image I, and S is an image containing only the foreground pixels of the input image I. Each image I, S, and B can have size H×W×C, where H represents the height of the images, W represents the width of the images, and C represents the number of channels in the images (e.g., where C=3 for RGB images). α is the alpha matte of size H×W×1, where $\alpha_i \in [0,1]$ for all pixels i of the input image I. An example of such a representation of an image/is described below with reference to FIG. 3A.

In some implementations, the output alpha matte 112 can be used to remove, replace, or blur the background pixels of the input image 102 to generate a final image U. In these implementations, the generated final image can be represented as:

$$U = \alpha I + (1 - \alpha)V$$

where V is a specified virtual background image and U is the matted final image containing the subject of the input image/in front of the virtual background.

With reference to FIG. 1A, the RNU neural network 100 can include an encoder neural network 104, a recurrent neural network 106 (e.g., a convolutional gated recurrent unit (Conv-GRU)), and a decoder neural network 108.

In some implementations, the RNU neural network 100 is a $U^2$-Net, which is discussed in more detail below with reference to FIG. 2A and FIG. 2B. Both local and global contextual information extracted from the input image 102 can be important for foreground-background segmentation, while multilevel feature extraction techniques have shown better results for foreground-background segmentation and other segmentation tasks. The $U^2$-Net enables efficient extraction of intra-stage multi-scale features and aggregation of inter-stage multi-level features. For this reason, the RNU neural network 100 can employ the $U^2$-Net as the backbone.

The encoder neural network 104 is configured to process the input image 102 and to generate an embedding of the input image 102. In this specification, an embedding of an input is an ordered collection of numeric values that represents the input in a particular embedding space. For example, the embedding can be a vector of floating point or other numeric values that has a fixed dimensionality. The encoder neural network 104 can include one or more neural network layers of any appropriate type. For example, the encoder neural network 104 can include one or more of: one or more convolutional neural network layers, one or more recurrent neural network layers, or one or more of self-attention neural network layers (also called "Transformer" neural network layers).

As a particular example, the encoder neural network 104 can be a nested-U encoder. Nested-U encoders are described in more detail below with reference to FIG. 2A and FIG. 2B. In some such implementations, the encoder neural network 104 can include a sequence of one or more network blocks that itself includes a Conv-GRU.

The recurrent neural network 106 is configured to process the embedding of the input image 102 generated by the encoder neural network 104 using one or more recurrent neural network layers and to generate an updated embedding of the input image 102. For example, in implementations in which the neural network 100 is configured to process each video frame in a sequence of video frames, the recurrent neural network 106 can be configured, at each time point t, to process (i) the embedding of the $t^{th}$ video frame generated by the encoder neural network 104, and (ii) an output or intermediate output $n_{t-1}$ of the recurrent neural network 106 generated at the preceding time point t-1 (i.e., the output or intermediate output generated in response to processing the embedding of the (t-1)$^{th}$ video frame).

The decoder neural network 108 is configured to process the updated embedding of the input image 102 generated by the recurrent neural network 106 and to generate the network output 112 that represents the foreground-background segmentation of the initial image 102. The decoder neural network 108 can include one or more neural network layers of any appropriate type. For example, the decoder neural network 108 can include one or more of: one or more convolutional neural network layers, one or more recurrent neural network layers, or one or more of self-attention neural network layers.

As a particular example, the decoder neural network 108 can be a nested-U decoder, as described in more detail below with reference to FIG. 2A and FIG. 2B. In implementations in which the network output 112 generated by the decoder neural network 108 is smaller than the input image 102, the network output 112 can be upsampled to the same image size as the input image 102 and concatenated together, followed by a pixel-wise convolution for fusion and a sigmoid activation function.

In some implementations in which the neural network 100 is configured to process each video frame in a sequence of video frames at respective time points, the RNU neural network 100 is trained by a training engine 110 using a temporal consistency metric, to ensure consistency between the network output 112 and the network output @t-1 generated at the preceding time point. Temporal consistency metrics are described in more detail below with reference to FIG. 4.

Figure 1B:
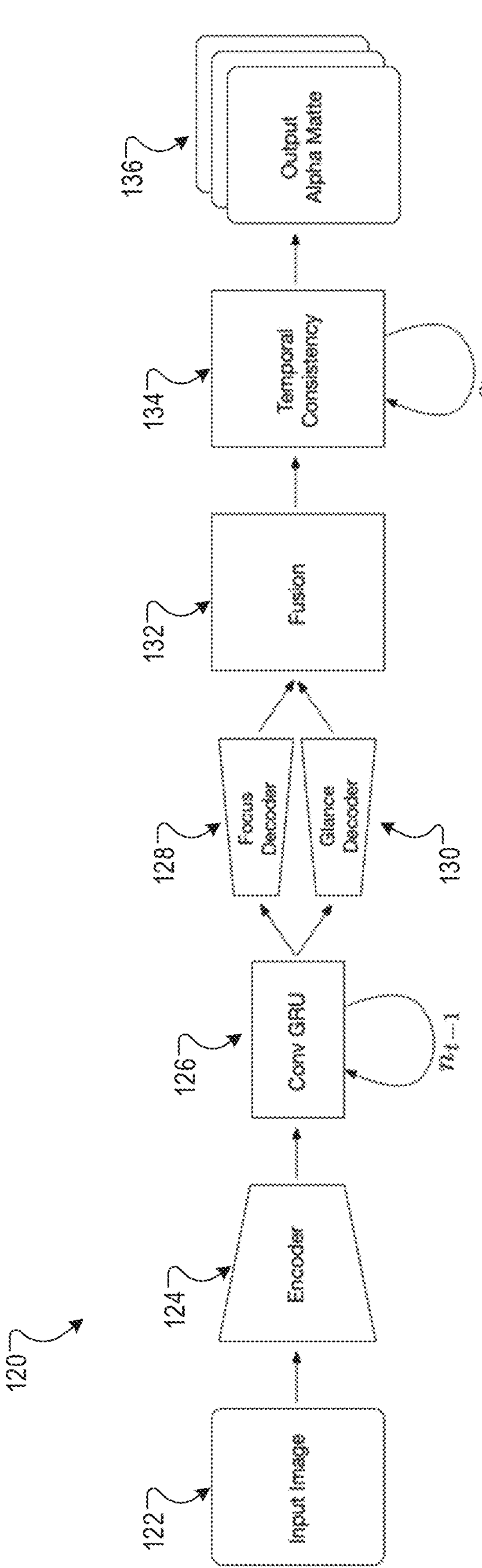

FIG. 1B depicts a neural network 120 that is configured to process an input image 122 and to generate a network output 136 that identifies, for each pixel in the input image 122, whether the pixel is a foreground pixel or a background pixel. As described above, such a network output is sometimes called an "alpha matte" 136.

The architecture of the neural network 120 is sometimes called a recurrent nested U-Net with glance and focus decoders (RNU-GF) architecture.

The RNU-GF neural network 120 includes an encoder neural network 124, a recurrent neural network 126 (e.g., a convolutional gated recurrent unit (GRU)), a focus decoder neural network 128, a glance decoder neural network 130, and a fusion neural network 132.

The encoder neural network 124 is configured to process the input image 122 and to generate an embedding of the input image 122. The encoder neural network 124 can be configured similarly to the encoder neural network 104 described above with reference to FIG. 1A.

The recurrent neural network 126 is configured to process the embedding of the input image 122 and to generate an updated embedding of the input image 122. The recurrent neural network 126 can be configured similarly to the recurrent neural network 106 described above with reference to FIG. 1B.

The RNU-GF neural network 120 includes two different decoders that are configured to process the updated embedding of the input image 102 generated by the recurrent neural network 126: the focus decoder neural network 128 and the glance decoder neural network 130.

The focus decoder neural network 128 is configured to process the updated embedding of the input image 102 and to extract local information (also called local context) from the updated embedding. In some implementations, the focus decoder neural network 128 includes one or more RSU blocks, as described above with reference to FIG. 1A. In some such implementations, as opposed to in some implementations of the RNU architecture, the RSU blocks of the focus decoder neural network 128 does not generate multi-scale outputs at each stage of the processing.

The glance decoder neural network 130 is configured to process the updated embedding of the input image 102 and to extract global information (also called global context) from the updated embedding. For example, the glance decoder neural network 130 can be configured to generate a feature map such that its sigmoid activation is a trimap or trinary image mask capturing foreground, background, and transition pixels. Trimaps are discussed in more detail below with reference to FIG. 3B.

In some implementations, the glance decoder neural network 130 uses a Pyramid Pooling Module (PPM) for global context forwarding. An example PPM is depicted in FIG. 5.

Figure 5:
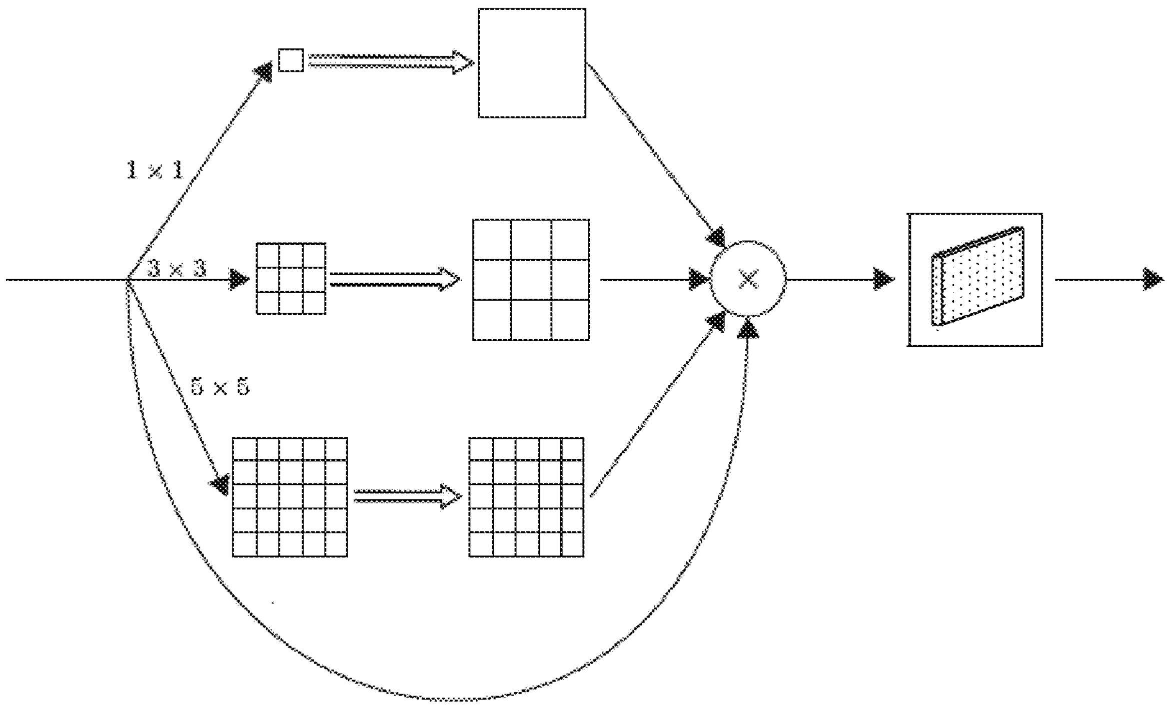
FIG. 5 is a diagram of an example pyramid pooling module.

Referring to FIG. 5, a Pyramid Pooling Module (PPM) is applied to harvest different sub-region representations, followed by upsampling and concatenation layers to form the final feature representation, which carries both local and global context information.

The PPM can be a four-stage module consisting of multiple (e.g., three) parallel adaptive pooling layers, e.g., layers that bring the input to sizes 1×1×C, 3×3×C, and 5×5×C, for a C-channel input map. The pooled layers can be upsampled back to the size of the input map and concatenated together along with the input map. The concatenated feature map can undergo an element-wise convolution at the final stage of the PPM.

Referring back to FIG. 1B, each stage in the glance decoder neural network 130 can involve concatenating the upsampled PPM with the output of the previous stage, optionally followed by a 3×3 convolution, batch-normalization (BN), and ReLU activation.

The fusion neural network 132 is configured to combine the output of the focus decoder neural network 128 and the glance decoder neural network 130. The fusion neural network 132 is sometimes called a combining neural network. The fusion neural network 132 can include any appropriate type of neural network layers. For example, the fusion neural network 132 can include one or more convolutional neural network layers (e.g., a 3×3 convolutional neural network layer), a nonlinear activation function (e.g., a ReLU activation function), one or more pixel-wise convolutional neural network layers, and/or a sigmoid activation function to generate the final output 136 of the neural network 120.

As described above with reference to FIG. 1A, in some implementations, the neural network 120 is trained by a training system 134 using a temporal consistency metric.

In some implementations, the RNU and RNU-GF networks, shown in FIGS. 1A and 1B, require no priors and no additional latency after the forward pass. They can take advantage of the simplicity of the nested U-structure, combined with the feed-forward nature of the Conv-GRU for real-time online processing. The combination of the nested U-structure with a Conv-GRU allows the system to utilize multi-level spatial context (from $U^2$-Net) as well as temporal context (from RFCN). RNU attains global and local context through the aggregation of multi-scale decoder outputs. RNU-GF attains global and local context through the use of two decoders, one for "glance" or global context, and the other for "focus" of local context.

Figure 2A:
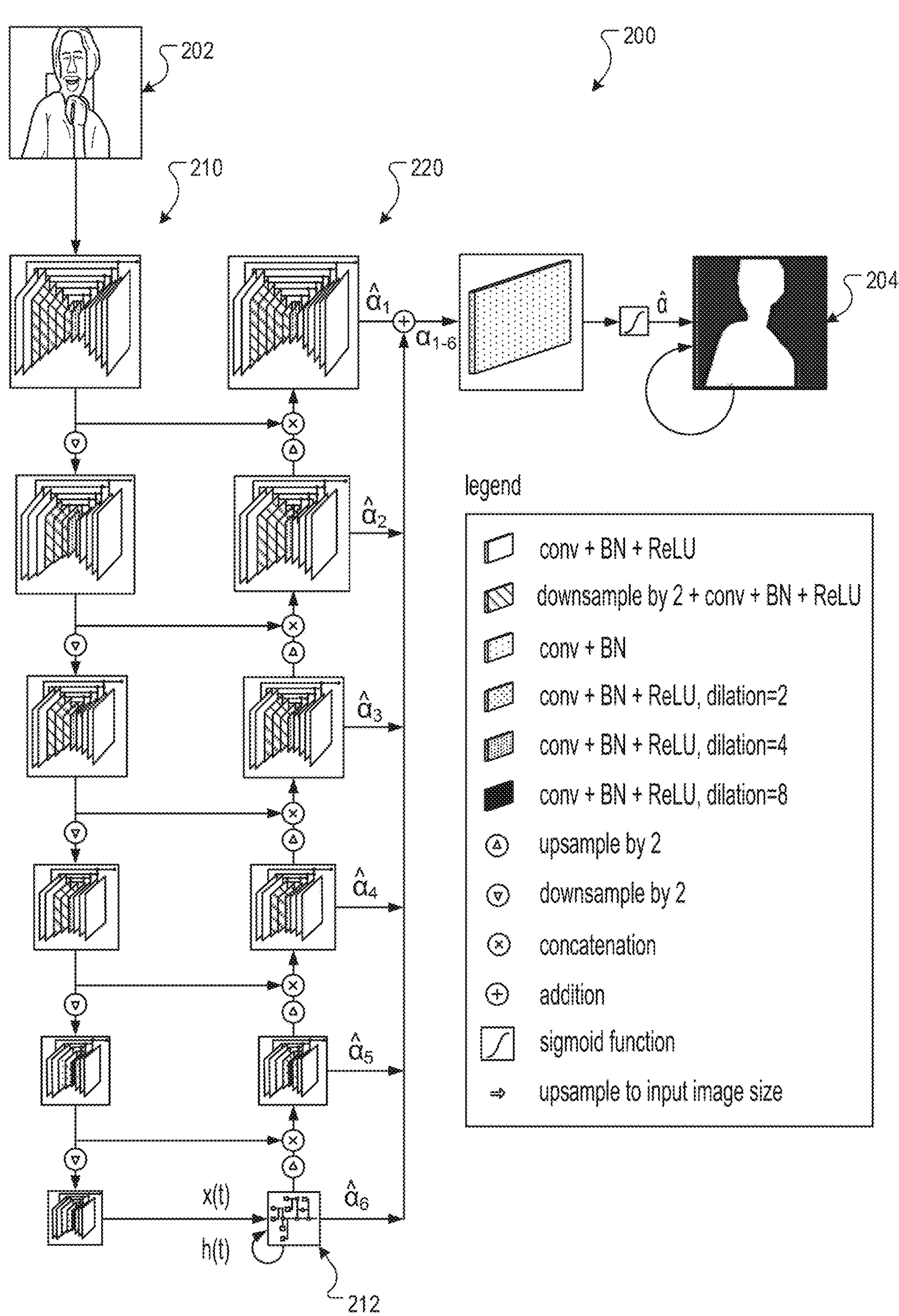

FIG. 2A shows a Recurrent Nested-U Net (RNU) neural network architecture 200 that is configured to process an input image 202 and to generate a foreground-background segmentation 204 of the input image 202. The RNU neural network 200 includes an encoder neural network 210 and a decoder neural network 220, e.g., which can be configured similarly to the encoder neural network 104 and the decoder neural network 108 described above with reference to FIG. 1A, respectively.

The RNU neural network 200 has a U2Net nested U-structure with a Convolutional Gated Recurrent Unit (Conv-GRU) 212 following the encoder neural network 210. In some implementations, as described in more detail below, the RNU neural network 200 has been trained using a transition area loss function to ensure fine-grained details along the edges of the output 204. The encoder neural network 210 includes a stack of encoder blocks, and the decoder neural network 220 includes a stack of decoder blocks that each generate a respective prediction $\hat{\alpha}_i$ of the alpha matte 204, scaled to a respective different size.

In this specification, a Conv-GRU is a gated recurrent unit that includes one or more convolutional neural network layers.

Figure 2B:
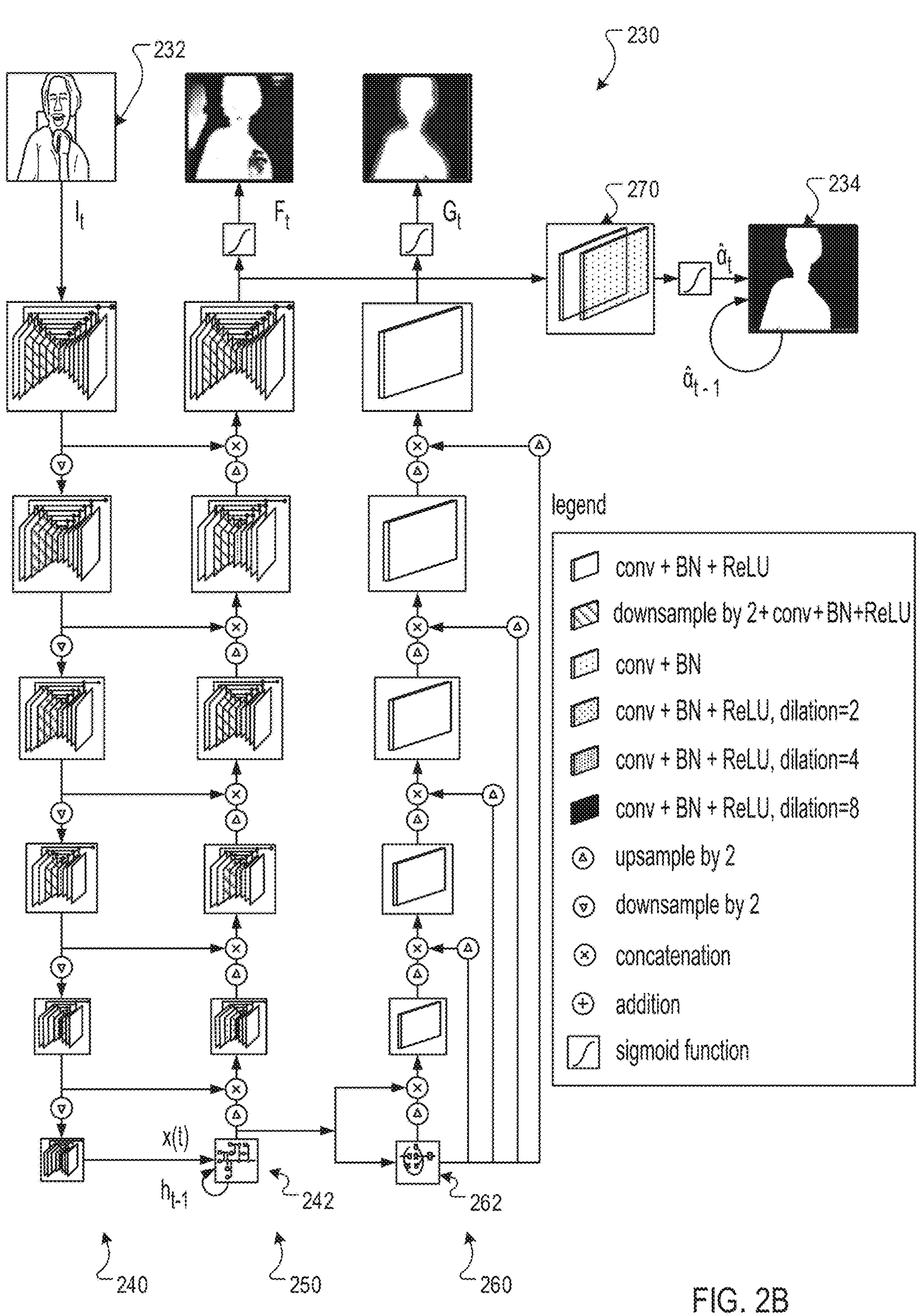

FIG. 2B shows a Recurrent Nested-U Net neural network with Glance and Focus decoders (RNU-GF) 230 that is configured to process an input image 232 and to generate a foreground-background segmentation 234 of the input image 232. The RNU-GF neural network 230 includes an encoder neural network 240, a focus decoder neural network 250, and a glance decoder neural network 260, e.g., which can be configured similarly to the encoder neural network 124, focus decoder neural network 128, and glance decoder neural network 130 described above with reference to FIG. 1B, respectively.

The encoder neural network 240 has a shared nested U-structure architecture, followed by a Conv-GRU 242. The glance decoder neural network 260 can include a PPM 262, as described above with reference to FIG. 5. The outputs of the two decoders 250 and 260 can be fused with one or more trainable convolutional layers 270 (that is, one or more neural network layers configured similarly to the fusion neural network 132, as described above with reference to FIG. 1B), allowing training to take place in a single stage, as seen in FIG. 1B.

Figure 2C:
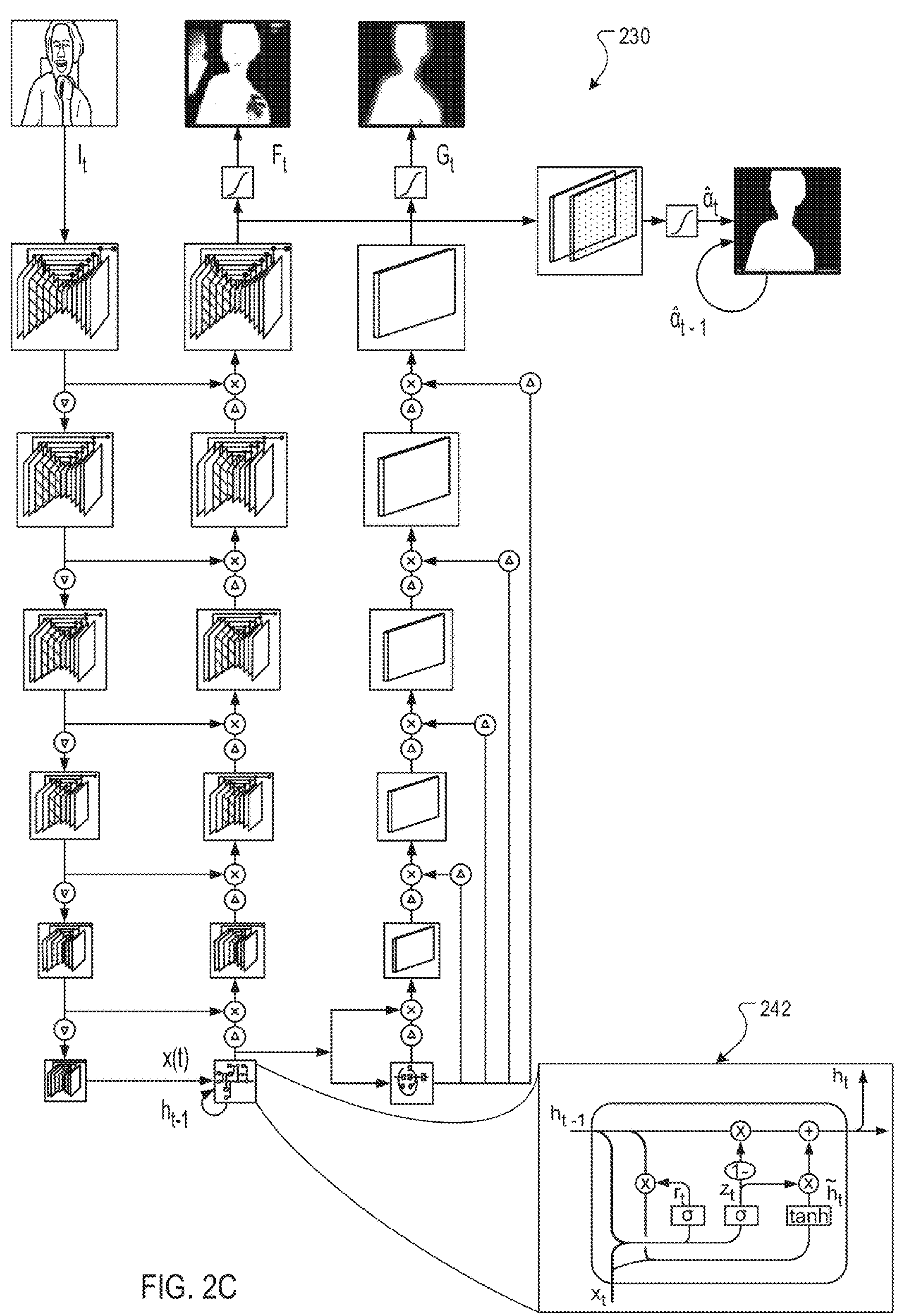

FIG. 2C shows the RNU-GF neural network 230 described above with reference to FIG. 2B, with a magnified depiction of the Conv-GRU 242 that follows the encoder neural network 240. The Conv-GRU 242 can allow the RNU-GF neural network 230 to capture temporal context between frames of a video, to ensure consistency in the segmentations 234 of consecutive frames.

In particular, the Conv-GRU 242 can compute:

$$z_t = \sigma(W_z \cdot [h_{t-1}, x_t])$$

$$r_t = \sigma(W_r \cdot [h_{t-1}, x_t])$$

$$\tilde{h}_t = \tanh(W \cdot [r_t * h_{t-1}, x_t])$$

$$h_t = (1 - z_t) * h_{t-1} + z_t * \tilde{h}_t$$

where one or more of the $W_2$, $W_r$, or W terms represent convolutional neural network layers.

Figure 3A:
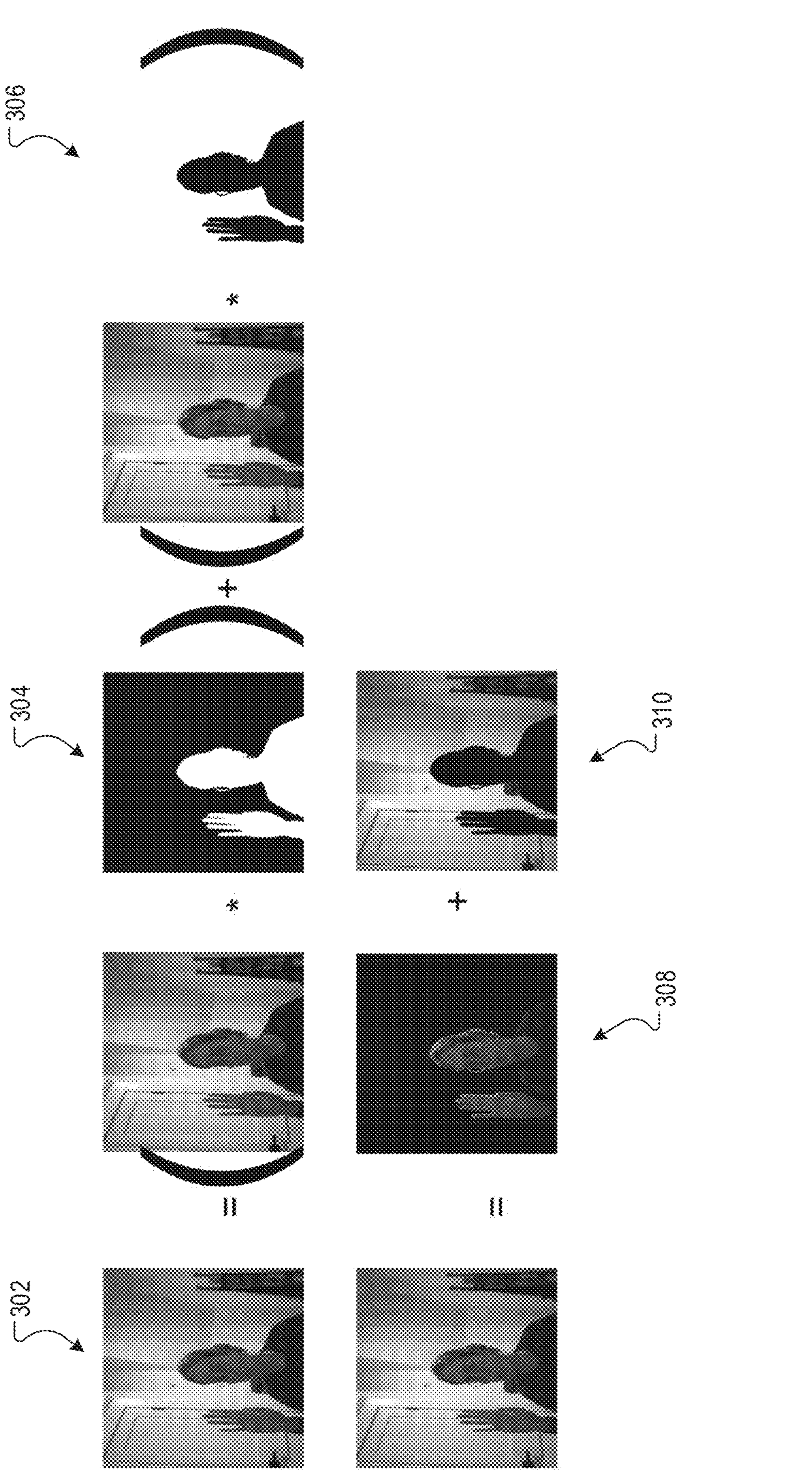

FIG. 3A is an illustration of an example image 302 and corresponding foreground-background segmentation 304. The foreground-background segmentation includes a respective value for each pixel of the image 302, where a value of '1' (represented as white in FIG. 3A) indicates that the pixel is a foreground pixel of the image 302 and a value of '0' (represented as black in FIG. 3A) indicates that the pixels is a background pixel of the image 302. The foreground-background segmentation 304 can have been determined by a neural network configured as described in this specification, e.g., by the neural network 100 described above with reference to FIG. 1A or by the neural network 120 described above with reference to FIG. 1B.

As illustrated in FIG. 3A, the image 302 can be decomposed into a set of foreground pixels 308 and a set of background pixels 310. The set of foreground pixels 308 can be determined by masking the image 308 using the foreground-background segmentation 304. The set of background pixels 310 can be determined by masking the image 302 using an inverse 306 of the foreground-background segmentation 304 (i.e., where the foreground pixels are identified by '0' value and the background pixels are identified by a '1' value).

FIG. 3B is an illustration of example segmented images.

A ground-truth network output 312 represents the true foreground-background segmentation of an image, and can be used to train a neural network to perform the segmentation; this process is discussed in more detail below with reference to FIG. 4.

A transition area 314 represents pixels that border the foreground and background pixels of the ground-truth network output 312. The transition area 314 can be generated by applying a fixed-width pixel border to the transitions between foreground and background pixels of the ground-truth network output 312.

A tri-map 316 represents pixels that are foreground (in white), transition (in gray), and background (in black).

Figure 4:
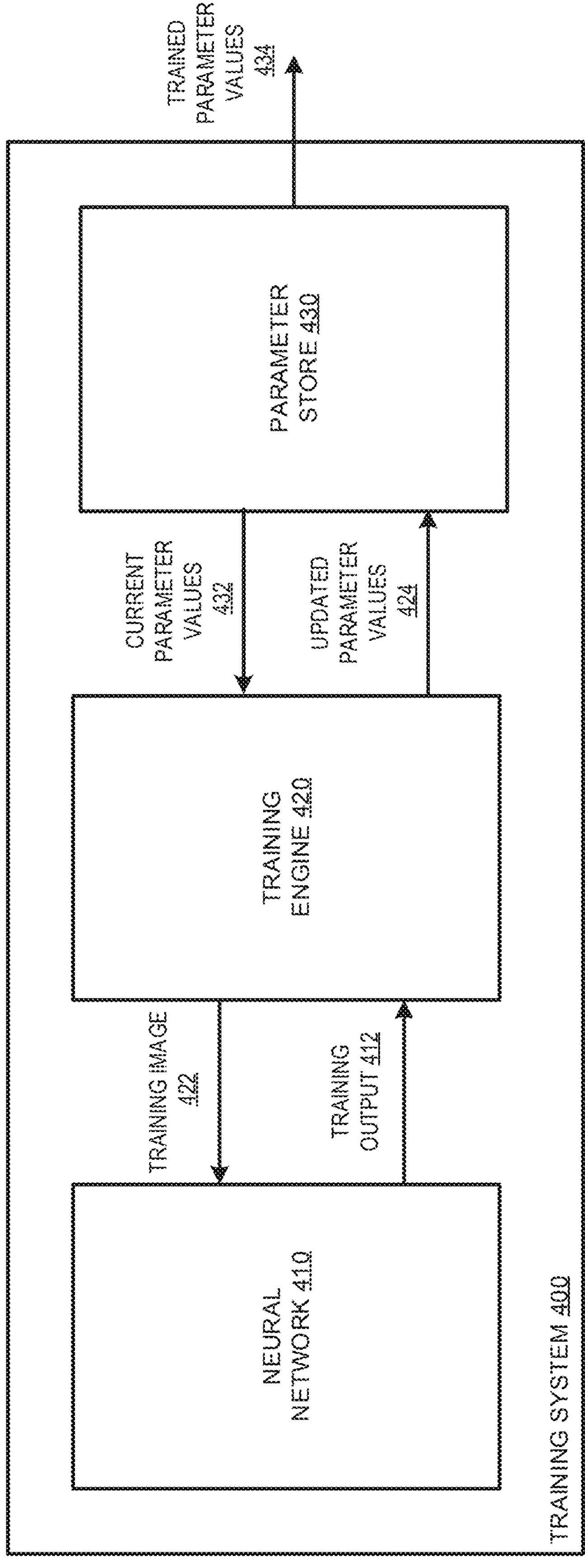
FIG. 4 is a block diagram of an example training system.

FIG. 4 is a diagram of an example training system 400. The training system 400 is an example of a system implemented as computer programs on one or more computers in one or more locations in which the systems, components, and techniques described below are implemented.

The training system 400 is configured to train a neural network 410, e.g., the neural networks depicted in FIG. 1A, 1B, 2A, or 2B, to generate a foreground-background segmentation of an input image. The training system 400 includes the neural network 410, a training engine 420, and a parameter store 430.

The parameter store 430 is configured to store the current values 432 for the parameters of the neural network 410. The training engine 420 can obtain the current parameter values 432 from the parameter store 430, and use the current parameter values 432 to process training images 422 using the neural network 410 to generate training outputs 412. The training engine 420 can determine an error in the training outputs 412 to generate a parameter update for the neural network 410.

In some implementations, e.g., if the neural network 410 has an RNU network architecture, the training engine 420 can train the neural network 410 using a weighted sum of multiple loss functions. The loss functions can include one or more of: multi-level Binary Cross Entropy (BCE), transition-area loss and consistency loss.

The multi-level BCE loss $l_m$ can be computed by:

$$\ell_m = \sum_{m=1}^{M} \lambda_m \ell_b(\hat{s}_m, s_m) + \lambda_f \ell_b(\hat{\alpha}_m, \alpha_m)$$

$$\ell_b(\hat{\alpha}, \alpha) = \sum_i \alpha_i \log(\hat{\alpha}_i) + (1 - \alpha_i)\log(1 - \hat{\alpha}_i)$$

where m∈{1, . . . . M} is the index of the decoder block of the neural network 410, $\hat{s}_m$ identifies the foreground pixels of the scaled image 202 identified by output of the $m^{th}$ decoder block (e.g., the predicted alpha matte $\hat{\alpha}_m$ rounded to 0 or 1), $s_m$ is the ground-truth set of foreground pixels of the scaled image 292 for the $m^{th}$ decoder block, $\hat{\alpha}_m$ is the predicted alpha matte generated by the $m^{th}$ decoder block of the neural network 410, $\alpha_m$ is the ground-truth alpha matte for the $m^{th}$ decoder block, and $\lambda_m$ and $\lambda_f$ are hyperparameters of the neural network 410.

In some implementations in which the neural network 410 is configured to process each training video frame 422 in a sequence of training video frames, in order to ensure stability between frames, the training engine 420 can use a consistency loss, which can be the mean absolute error of the number of predicted foreground pixels between frames, normalized by the mean predicted foreground pixels per image in the sequence given by:

$$\ell_c = \frac{\frac{1}{n-1}\sum_{t=1}^{n} |\hat{\beta}_t - \hat{\beta}_{t-1}|}{\frac{1}{n}\sum_{t=0}^{n} \hat{\beta}_t}$$

where $$\hat{\beta} = \hat{\alpha}|_{>=0.5}$$

corresponds to values predicted as foreground, t∈{0, . . . , n} is the frame number, and n is the length of the sequence of training video frames.

To better ensure high-detailed edges, the training engine 420 can employ a transition loss. As described above with reference to FIG. 3B, the training engine 420 can determine a transition area by dilating and eroding the ground truth mask, e.g., by five, six, ten, or twenty-five percent of the smaller of height and width, generating a transition mask T. Then the transition loss $l_{tran}$ is given by:

$$\ell_t = \ell_b(\hat{\alpha} * T, \alpha * T)$$

where * is elementwise multiplication.

As a particular example, the overall loss can be given by:

$$\mathcal{L}_{RNU} = w_m \ell_m + w_c \ell_c + w_t \ell_t,$$

where the w's are constant weight values and can be hyperparameters of the system 400.

In some other implementations, e.g., if the neural network 410 is an RNU-GF, the loss function can have multiple components, including one or more of: glance loss, focus loss, fusion loss, and consistency loss.

The glance loss can be given by:

$$L_g = \ell_b(\hat{G}, G),$$

where G is the trimap generated by a summation of the erosion and dilation of α, where 0 maps to definitely foreground, 1 maps to transition area, and 2 maps to definitely background. Ĝ is the output of the sigmoid activation function applied to the glance decoder output.

The focus loss can have three components, a l2-norm component, a binary cross-entropy component, and a Laplacian component. The l2-norm component is given by:

$$\ell_{f_1} = \frac{\|(\hat{F} - \alpha) * T\|_2}{\sum_i (T_i) + \epsilon},$$

where F̂ is the output of the sigmoid activation function applied to the output of the focus decoder, and $T = G|_1$ relates to the transition area such that T=1 where G=1 and T=0 everywhere else.

The cross-entropy component can be the cross-entropy of F̂ and α in the transition area T:

$$\ell_{f_2} = \ell_b(\hat{F} * T, \alpha * T).$$

The transition loss can be given by:

$$\ell_{f_3} = \sum_i T_i \sum_{k=1}^{S} \|\mathrm{Lap}^k(\hat{F}_i * T) - \mathrm{Lap}^k(\alpha_i * T)\|_1$$

where $\mathrm{Lap}^k$ denotes the $k^{th}$ level of the Laplacian pyramid.

Altogether, the focus loss can be given by:

$$L_f = \ell_{f_1} + \ell_{f_2} + \ell_{f_3}$$

The fusion loss can contain two components, an l2-norm loss and a binary cross-entropy loss:

$$L_u = \ell_b(\hat{\alpha}, \alpha) + \|\hat{\alpha} - \alpha\|_2$$

The full loss function can be given by:

$$\mathcal{L}_{GF} = w_g L_g + w_f L_f + w_u L_u + w_c \ell_c$$

where the w's are constant weight values and can be hyperparameters of the system 400.

Once the error is computed, the training engine 420 can use backpropagation and stochastic gradient descent to determine an update to the parameters θ of the neural network.

After updating the parameters of the neural network, the training engine 420 can provide the updated parameter values 424 to the parameter store 430.

After training is completed, the training system 400 can output the final trained values 434 of the parameters of the neural network. In some implementations, the training system 400 can determine to complete training after processing a predetermined number of training examples. In some other implementations, the training system 400 can determine to complete training after a performance metric (e.g., prediction accuracy of a validation or testing data set) of the neural network exceeds a predetermined threshold. In some other implementations, the training system 400 can determine to complete training after an incremental improvement of the performance metric of the neural network across multiple training time steps drops below a predetermined threshold, i.e., after the performance of the neural network is no longer significantly improving.

For example, the training system 400 can provide the trained parameter values 434 to an inference system that is configured to receive input images and to process the input images using the trained neural network to generate a segmentations of the images. In some implementations, the inference system can be deployed on a local device of a user. In some other implementations, the inference system can be deployed onto a cloud system, i.e., a distributed computing system having multiple computing nodes, e.g., hundreds or thousands of computing nodes, in one or more locations.

Figure 6:
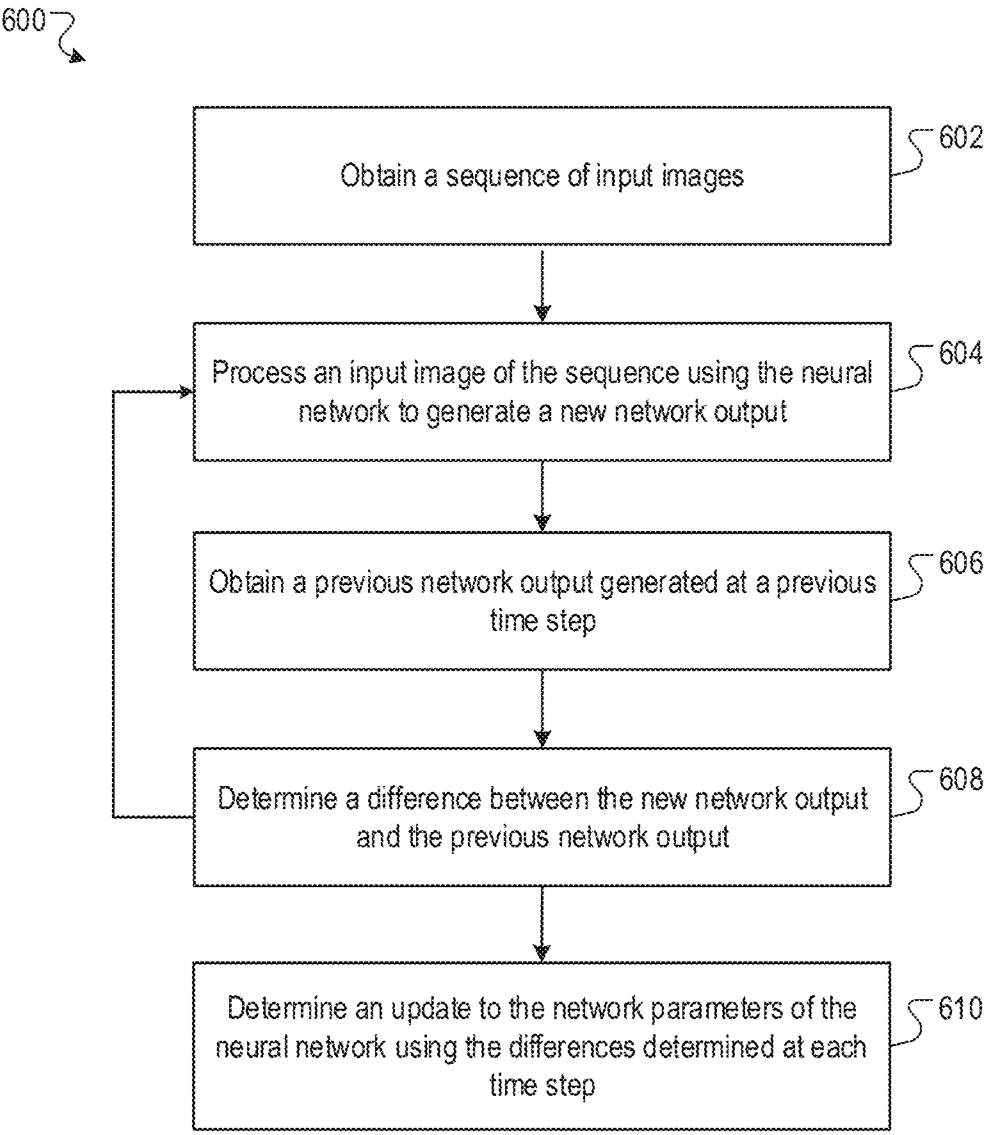
FIG. 6 is a flow diagram of an example process for training a neural network to generate a foreground-background segmentation of an input image.

FIG. 6 is a flow diagram of an example process 600 for training a neural network to generate a foreground-background segmentation of an input image. For convenience, the process 600 will be described as being performed by a system of one or more computers located in one or more locations. For example, a training system, e.g., the training system 400 described above with reference to FIG. 4, appropriately programmed in accordance with this specification, can perform the process 600.

The system obtains a sequence of input images, each input image corresponding to a time step (step 602).

The system can repeat the steps 604, 606, and 608 for each input image in the sequence of input images at a respective processing time step.

The system processes a first input image of the sequence corresponding to the time step using the neural network to generate a new network output for the time step (step 604). The new network output can identify a set of foreground pixels and a set of background pixels of the first input image.

The system obtains a previous network output generated by the neural network at a previous time step (step 606). The previous network output can identify a set of foreground pixels and a set of background pixels of a second input image of the sequence that corresponds to the previous time step. At the first time step corresponding to the first input image in the sequence, the system can skip steps 606 and 608 because there is not previous network output.

The system determine a difference between the new network output and the previous network output (step 608).

After the final time step corresponding to the final input image in the sequence, the system can proceed to step 610.

The system determines an update to a set of network parameters of the neural network using the difference determined at each respective time step.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters to perform foreground-background segmentation, the method comprising:

obtaining a sequence of input images, each input image corresponding to a time step;

at each time step of a plurality of the time steps:

processing a first input image of the sequence that corresponds to the time step using the neural network to generate a new network output for the time step, wherein the new network output identifies a plurality of foreground pixels and a plurality of background pixels of the first input image;

obtaining a previous network output generated by the neural network at a previous time step, wherein the previous network output identifies a plurality of foreground pixels and a plurality of background pixels of a second input image of the sequence that corresponds to the previous time step; and determining a difference between the new network output and the previous network output; and determining an update to the plurality of network parameters using the difference determined at each time step of the plurality of time steps, wherein determining the update to the plurality of network parameters comprises computing consistency loss, which is a mean absolute error of a number of predicted foreground pixels between frames, normalized by a mean predicted foreground pixels per image in the sequence, wherein determining a difference between the new network output and the previous network output comprises:

determining a number of foreground pixels in the first input image identified by the new network output;

determining a number of foreground pixels in the second input image identified by the previous network output; and determining the difference between the new network output and the previous network output using the respective numbers of foreground pixels, wherein determining the update to the plurality of network parameters comprises computing:

$$\ell_c = \frac{\frac{1}{n-1}\sum_{t=1}^{n}\left|\hat{\beta}_t - \hat{\beta}_{t-1}\right|}{\frac{1}{n}\sum_{t=0}^{n}\hat{\beta}_t},$$

wherein $\hat{\beta}_t$ is the number of foreground pixels identified in the input image corresponding to time step t, $\hat{\beta}_{t-1}$ is the number of foreground pixels identified in the input image corresponding to time step t-1, and n is a number of time steps; and utilizing the neural network based on the plurality of updated network parameters to process the sequence of input images to generate images segmented by foreground and background.

2. The method of claim 1, wherein determining the update to the plurality of network parameters comprises:

obtaining a ground-truth network output corresponding to a particular time step of the plurality of time steps;

determining a difference between i) the network output generated by the neural network at a particular time step and ii) the ground-truth output; and determining the update using the determined difference.

3. The method of claim 1, wherein determining the update to the plurality of network parameters comprises:

obtaining a ground-truth network output corresponding to a particular input image;

identifying a plurality of transition pixels in the particular input image using the groundtruth network output, wherein each transition pixel is in a transition region between a plurality of foreground pixels of the particular input image and a plurality of background pixels of the particular input image;

determining a difference between i) labels for the transition pixels identified by the ground-truth output and ii) labels for the transition pixels identified by the network output generated by the neural network in response to processing the particular input image; and determining the update using the determined difference.

4. The method of claim 1, wherein the neural network comprises:

an encoder subnetwork that is configured to process an encoder subnetwork input comprising an input image and to generate an embedding of the input image; and a decoder subnetwork that is configured to process a decoder subnetwork input generating using the embedding of the input image and to generate the network output.

5. The method of claim 4, wherein:

the neural network further comprises a convolutional recurrent neural network that is configured to process the embedding of the input image and to generate an updated embedding of the input image; and the decoder subnetwork input comprises the updated embedding of the input image.

6. The method of claim 4, wherein the decoder subnetwork comprises:

a glance subnetwork that is configured to generate a glance subnetwork output that represents a global context of the input image;

a focus subnetwork that is configured to generate a focus subnetwork output that represents a local context of the input image;

a combining subnetwork that is configured to process the glance subnetwork output and the focus subnetwork output and to generate the network output.

7. The method of claim 4, wherein:

the encoder subnetwork comprises a plurality of encoder subnetwork blocks that are each configured to process the encoder subnetwork input at a different spatial resolution; and the decoder subnetwork comprises a plurality of decoder subnetwork blocks that are each configured to process the decoder subnetwork input at a different spatial resolution.

8. The method of claim 7, wherein:

each encoder subnetwork block corresponds to a respective decoder subnetwork block that operates at the same spatial resolution; and the neural network comprises, for each encoder subnetwork block, a skip connection between the encoder subnetwork block and the corresponding decoder subnetwork block.

9. A method comprising:

obtaining a sequence of input images, each input image corresponding to a time step; and at each time step of a plurality of the time steps:

determining a hidden internal state from a first network output generated by a neural network at a first time step, wherein the first network output identifies a plurality of foreground pixels and a plurality of background pixels of a first input image of the sequence corresponding to the first time step;

processing a second input image of the sequence that corresponds to a second time step subsequent to the first time step using the neural network to generate a second network output for the second time step, wherein the second network output identifies a plurality of foreground pixels and a plurality of background pixels of the second input image, and wherein the second network output is a function of both the second input image and the hidden internal state input derived at the first time step; and taking an action based on at least one of the plurality of foreground pixels and the plurality of background pixels of the second input image, wherein the neural network has been trained based on a consistency loss, which is a mean absolute error of a number of predicted foreground pixels between frames, normalized by a mean predicted foreground pixels per image in the sequence, wherein taking the action comprises one or more of:

replacing the plurality of background pixels of the second input image with a plurality of pixels of a different image, or applying a blurring function to the plurality of background pixels of the second input image, wherein the neural network has been trained using a loss function l:

$$\ell_c = \frac{\frac{1}{n-1}\sum_{t=1}^{n}\left|\hat{\beta}_t - \hat{\beta}_{t-1}\right|}{\frac{1}{n}\sum_{t=0}^{n}\hat{\beta}_t}$$

wherein $\hat{\beta}_t$ is a number of foreground pixels identified in the input image corresponding to time step t, $\hat{\beta}_{t-1}$ is the number of foreground pixels identified in the input image corresponding to the time step t-1, and n is the number time steps; and utilizing the trained neural network based on the plurality of updated network parameters to process the sequence of input images to generate segmentations of images.

10. The method of claim 9, wherein the neural network comprises one or more convolutional gated recurrent unites (Conv-GRUs).

11. The method of claim 9, wherein processing the second input image using the neural network to generate the second network output comprises:

processing the second input image using an encoder subnetwork that is configured to process an encoder subnetwork input comprising the second input image and to generate an embedding of the second input image; and a decoder subnetwork that is configured to process a decoder subnetwork input generating using the embedding of the second input image and to generate the second network output.

12. The method of claim 11, wherein:

the neural network further comprises a convolutional recurrent neural network that is configured to process (i) the embedding of the second input image and (ii) the hidden internal state input derived at the first time step to generate an updated embedding of the second input image; and the decoder subnetwork input comprises the updated embedding of the second input image.

13. The method of claim 11, wherein the decoder subnetwork comprises:

a glance subnetwork that is configured to generate a glance subnetwork output that represents a global context of the second input image;

a focus subnetwork that is configured to generate a focus subnetwork output that represents a local context of the second input image;

a combining subnetwork that is configured to process the glance subnetwork output and the focus subnetwork output and to generate the second network output.

14. A system comprising one or more computers and one or more storage devices storing instructions that when executed by the one or more computers cause the one more computers to perform operations comprising:

obtaining a sequence of input images, each input image corresponding to a time step;

at each time step of a plurality of the time steps:

processing a first input image of the sequence that corresponds to the time step using a neural network to generate a new network output for the time step, wherein the new network output identifies a plurality of foreground pixels and a plurality of background pixels of the first input image;

obtaining a previous network output generated by the neural network at a previous time step, wherein the previous network output identifies a plurality of foreground pixels and a plurality of background pixels of a second input image of the sequence that corresponds to the previous time step; and determining a difference between the new network output and the previous network output; and determining an update to a plurality of network parameters using the difference determined at each time step of the plurality of time steps, wherein determining the update to the plurality of network parameters comprises computing consistency loss, which is a mean absolute error of a number of predicted foreground pixels between frames, normalized by a mean predicted foreground pixels per image in the sequence, wherein determining a difference between the new network output and the previous network output comprises:

determining a number of foreground pixels in the first input image identified by the new network output;

determining a number of foreground pixels in the second input image identified by the previous network output; and determining the difference between the new network output and the previous network output using the respective numbers of foreground pixels, wherein determining the update to the plurality of network parameters comprises computing:

$$\ell_c = \frac{\frac{1}{n-1}\sum_{t=1}^{n}\left|\hat{\beta}_t - \hat{\beta}_{t-1}\right|}{\frac{1}{n}\sum_{t=0}^{n}\hat{\beta}_t}$$

wherein $\hat{\beta}_t$ is the number of foreground pixels identified in the input image corresponding to time step t, $\hat{\beta}_{t-1}$ is the number of foreground pixels identified in the input image corresponding to the time step t-1, and n is the number time steps, wherein the neural network comprises one or more convolutional neural network layers, one or more recurrent neural network layers and one or more self-attention neural network layers; and utilizing the neural network based on the plurality of updated network parameters to process the sequence of input images to generate images segmented by foreground and background.

* * * * *